United States Patent Office 3,272,769
Patented Sept. 13, 1966

3,272,769
EPOXIDE-POLYESTER COMPOSITIONS AS MODIFIERS FOR THERMOPLASTIC RESINS
Csaba K. Hunyar, 8533 Apperson St., Sunland, Calif.
No Drawing. Filed June 14, 1965, Ser. No. 463,867
10 Claims. (Cl. 260—27)

This invention has to do generally with improving the properties of thermoplastic resins subject to physical processing for the purpose of developing or forming useful objects. More specifically, the invention is directed to eliminating or reducing certain deficiencies associated with or resulting from heat or fusion processing of vinyl polymerization thermoplastic resins. This application is a continuation-in-part of my prior application Serial No. 53,918, filed September 6, 1960, for "Thermoplastic Modifiers and Process for Modifying Thermoplastics," now abandoned.

It is found that heating of vinyl resins results in varying degrees of decomposition, depolymerization and degradation, depending among other things upon the resin composition, metallic impurities present, the temperature to which the resin is heated and the length of the heating interval. Other physical disadvantages commonly associated with these resins include lack of desired control of product lubricity, low impact resistance, haziness, opacity, non-uniformity of color in transparent materials, uncontrolled shrinkage, and the development after molding or injection of the resin of excessive and widespread internal stresses within the product which cause deformation, warpage and uncontrolled cold flow of the material.

The present invention has as its major objects the elimination or reduction of these aforementioned disadvantages, associated with the fusion processing of thermoplastic resins, especially of vinyl type, and with products made from such resins. Broadly, the invention concerns novel processes for forming modifying compositions, which are themselves novel, especially as used in treating thermoplastic resins in end product form.

More specifically, the process for forming the modifier composition usable in treating thermoplastic resin contemplates reacting a polyester type material preferably containing free carboxyl groups with a non-plasticizing complex epoxide containing oxirane rings for reaction with the carboxyl groups, the reaction being carried out in the presence of a catalyst, either independently of the thermoplastic resin to produce a product which may be reduced to powder for blending with the thermosetting resin, or within the resin itself.

Typical thermoplastic compounds which may be advantageously treated or modified in accordance with the invention include unplasticized polyvinyl chloride for rigid product applications, plasticized polyvinyl chloride, vinyl copolymers with acetate, vinylidene chloride, vinyl stearates with or without straight polyvinyl chlorides, and thermoplastic compounds containing double linkages such as styrene, acrylates, and the like in straight or copolymerized forms. Such compounds will oftentimes contain certain additives such as light and heat stabilizers, liquid or solid plasticizers, lubricants, organic colorants, and natural or artificial extenders. Inherent problems of incompatibility between such additives and the resins are eliminated or reduced by the presence in the resin of the modifier of the present invention. For example, such incompatibilities as opaqueness, lack of transparency and the existence of translucency are overcome by the addition of the modifier, the molded product resin becoming clear, transparent and fully compatible. Also, the modifier has a solubilizing effect on some organic colors and dyes, thereby permitting the use of such dyes in thermoplastics.

Referring to the polyester type material to be reacted with the complex epoxide, it is found of advantage to use a partly esterified material because of higher compatibility. Since the melting point or pour point ranges are important, the selection of the material containing carboxyl groups is important. Tests show that there are many materials with desirable melting points that have free carboxyl groups, and that produce useful products. Fully esterified organic acid is not suitable, nor are esters having strong plasticizing effect, due to their strong softening effect.

The polyester type material may comprise the reaction product obtained by esterifying polyhydric alcohol and organic acid containing 1 to 3 carboxyl groups. Typical acids include fumaric, maleic, abietic, itaconic, azelaic, phthalic, isophthalic, linear dibasic or dicarboxylic acids such as adipic, and tri-basic acids such as citric. Also, the hydroxyl containing material should preferably but not necessarily contain two or more hydroxyl groups. Typical of these materials are the alcohols, diols, glycols, or polyols, generally, including polyhydric phenols, di- or tri-pentaerythritol, glycerol and sorbitol. Aromatic alcohols with substitutions on the ring and/or on the side chains give suitable products, and theoretically at least almost all of the hydroxyl group containing materials are usable for the esterifying reaction. Examples of aryl alcohols include benzyl alcohol, catechol, resorcinol, hydroquinone, pyrogallol hydroxyhydroquinone, p-dimethylolbenzene, dihydroxyethylbenzene and cyclohexanediol.

Many of the natural resins or rosin, such as abietic resin or pine rosin or wood rosin, contain the necessary reactive groups and may be employed in the reaction with the epoxide material. Other usable partly esterified reaction products are those resins made by reacting the polyhydric alcohols with monocarboxylic, dicarboxylic and tricarboxylic acids having chains of 1 to 12 carbon atoms. Higher carbon chain lengths give too high lubricity to the thermoplastic resin, and also a slower reaction, so that a shorter chain length favors a definite reaction optimum.

Usually excess acid is necessary to produce the end product with the necessary acid number, which also depends upon the relative amounts of polyester and epoxide reacted to produce the modifier. By changing the relative amounts of these materials, it is possible to obtain a large number of different resins with different properties, which also depend upon the organic groups either on the acid or on the hydroxyl containing material. For successfully modifying different thermoplastic materials, a large variation in the physical properties of the carboxyl containing esterified materials or polyesters was permissible. For example, a melting or pour point range from 60° C. to 170° C. was found satisfactory, although the use of lower or higher melting points is not excluded for special applications. Several experiments showed that satisfactory results were obtained by using liquid esterification products or polyesters for reaction with the oxirane ring compounds or complex epoxides.

The best esterification reaction products were obtained by esterification condensation of two carboxyl containing acids with two hydroxyl containing reactants of either alkyl or aryl type. However, care should be taken not to thermoset the product. Optimum acid numbers of the polyester lie between 30 and 60, but useful products were obtained from polyesters with acid numbers above and below this numerical range.

All known epoxies are believed suitable for this reaction with the polyester, except those epoxies which on reaction in thermoplastics give a plasticizing effect. Typical usable epoxies include epichlorohydrin diphenol condensate, and epoxies condensed from organic dioxides such as vinylcyclohexanedioxide bisphenol A, as well as other oxirane ring containing materials. The bisphenol A and epichlorohydrin type resins are available with epoxide equivalent weights from 125 to 2000, which means that the coupling of the ester type resins with the epoxies may be accomplished with wide ratios. Epoxides with low epoxide equivalent weight are liquids, whereas those with higher equivalent weights comprise soft to hard resin.

In the reaction between the free carboxyl groups of the ester type resin or polyester material with the epoxy oxirane rings, the latter opens and forms a hydroxyl group producing an ester linkage. Also, the reaction yields a higher or lower melting or pour point material, depending upon the ratio of the free carboxyl groups and oxirane rings. The heat and time of reaction also affect the end properties of the modifying resin.

The use of epoxidized vegetable oils, fatty acids, as for example epoxidized soybean oil, and the like, are recommended only for special applications in view of their plasticizing properties. For examples of epoxidized fatty acids and vegetable oils see Becco Chem. Div. of Food Machinery and Chemical Corp. Bulletin 69 where epoxidation of butyl oleate, propyl oleate, soybean oil etc. is described. In this regard, epoxidized novolacs are more suitable. It should also be noted that the ester type resin is preferably free from unreacted anhydrides, which may cure the epoxy, and not all the oxirane rings should be reacted because free oxirane rings in the modifying resin tend to help the heat stabilization of certain thermoplastics such as vinyl chloride resins. Synergistic effect is involved especially by the use of lower molecular weight epoxies and metallic-organic stabilizers.

As to the catalyst, primary and secondary amines containing active hydrogen should be avoided since the latter eliminates the active oxirane rings in the epoxies, prevents the esterification reaction between the ester type resin and epoxy, and also cures the epoxy to a thermoset resin, producing a hard and tough material instead of a fluxing resin. On the other hand, quaternary amines are usable, and these include for example, lauryl trimethylammonium-bromide, and dilauryl dimethylammonium-bromide. Instead of lauryl, numerous different saturated or unsaturated alkyl or aryl groups may be used, and in place of bromide almost any of the inorganic and several organic amines may be used, such as chloride, fluoride, sulphate, nitrate, acetate, formiate and others. Care should be exercised to employ relatively pure quaternary amines, since otherwise they are apt to contain some primary and secondary amines as impurities.

The usable catalyst amine has a general formula as follows:

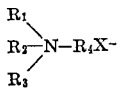

$R_1$, $R_2$, $R_3$ and $R_4$ are alkyl and/or aryl organic groups, and $X^-$ is an anion which does not form an insoluble product with the action group. These materials produce the catalytic action for the esterification reaction, and also provide the necessary lubrication for the thermoplastic, if the side chains on the nitrogen atom are carefully chosen.

One of the organic groups should be the major group, whereas the others are shorter, and for the necessary action it is required that there be a difference between the main and other groups. Thus, to have the desired lubrication, $R_1$ is chosen with a carbon chain length of 8 to 22. Longer chain lengths as regards $R_1$ provide increasing lubrication, whereas with shorter chain lengths, the main groups approach the minor groups and with decreasing lubricity valuable other properties are lost. For example, the vapor pressure of the material increases, which may give gaseous products causing blistering in the thermoplastic material at the processing temperatures.

$R_2$, $R_3$ and $R_4$ may be methyl, ethyl, isopropyl, ethoxy, propoxy and like groups, and the selection as between these groups may be made dependent upon the thermoplastic in which the modifying resin is to be used. For example, in polystyrene, methyl and ethyl groups are preferred, and in vinyl resins a one to one ratio of ethoxy and methyl or ethyl groups is preferred. Aryl groups may be used in place of alkyl groups for $R_1$, but not for $R_2$, $R_3$ and $R_4$. Aromatic rings, substituted or not, yield a product without lubricity. Combined aryl-alkyl groups give controlled lubricity; however, with too high molecular weight the material loses part of its catalytic action.

It should be noted that most of the modifying resin compounds are not necessarily transparent. Using the heat plasticizing effect with the thermoplastic material, a solubilization effect takes place together with the flux effect, and the resultant plastic is water clear. Different ester resins and catalyst tend to color the plastic, but the transparency as a rule remains very good. Pure raw material, especially catalysts, favor the formation of water clear thermoplastic moldings.

The reaction between the ester resin, epoxy and catalyst may be carried out in solution or in melts. For the former, an inert solvent or solvent combination is chosen which dissolves all the ingredients, and the reaction is stopped at the desired stage by the control of viscosity or other physical chemical method. Temperatures below the melting or pour point of the lowest melting material may be used in the solvent media, the chosen solvent having a boiling point between 60° C. and 120° C. Typical inert solvents in which the ingredients are refluxed include ketones such as acetone and methylethylketone, aromatic hydrocarbons such as toluene, esters of lower acids and alcohols such as ethylacetate, and solvent mixtures such as an aromatic hydrocarbon-alcohol mixture.

The reaction time in solution depends upon the reactants used and on the boiling point of of the solvent. It is also possible to use higher boiling point inert solvent and to carry out the reaction at temperatures below that boiling point. With some reactants, temperatures higher than 120° C. may be used. The reaction can be terminated at any desired stage by keeping close control of the product through sampling and testing. The resultant modifier is then produced by solvent distillation during which intensive mixing or agitation of the reactants should be contiuued in order to achieve an even distribution of the catalyst in the resin. The dried and cooled modifier resin is tough and normally brittle, permitting its pulverization to powdery form for blending with the thermoplastic resin.

The faster method of carrying out the reaction between the ester resin and epoxide is in molten phase. In this method the ester resin and epoxy are melted with stirring and the catalyst is introduced. Usually the desired reaction, which results in a small melting or pour point increase of the reactants, goes so fast that there is little or no time for checking or sampling the material during the process. Therefore, preliminary experiments should be carried out to set the desired temperature and time. While the melt procedure is easier and simpler to carry out, it requires skill and experience due to the criticality of the heat and time elements necessary to avoid an undesirable increase in the melting or pour point.

If desired, additives such as dyes, colors, pigments, plasticizers, stabilizers and other modification resins may be added in the modification resin so long as they do not alter the reaction between the ester resin and epoxide.

As an alternative, the ingredients of the modifying resin may be directly incorporated in the thermoplastic resin, the processing of which (molding, extrusion, vacuum forming, etc.) developing the esterification reaction. In most instances the thermoplastic material acts as a carrier or diluent, and the properties of the resultant modified thermoplastic resin do not differ markedly from the properties resulting from blending the pre-formed powdery modifier with the pure thermoplastic.

In the following examples illustrating specific processes carried out in accordance with the invention, the vinyl thermoplastic material is a polyvinyl chloride-acetate copolymer (such as the vinyl acetate-vinyl chloride copolymer, specified as RT–510 in the Data Sheet entitled, "Opalon RT–510," and available on the filing date), with 2% addition of primary stabilizer of solid, non-filling type, such as barium-cadmium soap (such as the well known barium-cadmium soap, specified as B–J2, and available on the filing date). Opalon RT–510 has the following composition and physical characteristics:

| | |
|---|---|
| Polyvinyl chloride _____percent__ | 85–87 |
| Specific gravity _____ | 1.354–1.358 |
| Specific viscosity _____ | 0.205–0.235 |
| Dry bulk density _____gm./cc__ | 0.60–0.70 |

The mentioned ester resin is a maleic acid polyhydric condensation product: pour point 140° C., acid number 38. The ester resin may be prepared as follows: In a laboratory reaction kettle equipped with a heating and cooling jacket, heat to 190° F. 50 grams of ethyleneglycol (0.8 mol) and 46 grams of glycerol (0.5 mol), and add 41 grams of pentaerythritol (0.3 mol) while stirring vigorously. Also, add 29.5 grams of phthalic anhydride (0.2 mol) and 117.2 grams of maleic anhydride (1.2 mols) and 170 grams of wood rosin. Blanket with an inert gas such as nitrogen, raise the material temperature to between 225 and 240° F., and stir the material vigorously during the entire cooking process. The kettle is equipped wth a condenser where the water evolving during the reaction as a by-product condenses and is separated from the material, the amount of water indicating the rate of reaction. Sample the material for acid number determination; when acid number drops below 60 apply a vacuum and continue cooking the material; and when acid number drops below 50 cool the kettle immediately as by means of cooling water in the kettle jacket. As epoxy, a bisphenyl A (p,p'-dihydroxydiphenyl dimethyl methane)-epichlorohydrin condensation resin is used in the examples: pour point 95° C., epoxy equivalent weight average approximately 600. This epoxy material is identified as Genepoxy 525 in the Data Sheet, entitled "What Are Genepoxy Resins," and available on the filing date.

The catalyst in the examples is a quaternary ammonium compound where $R_1$ equals 12–14 carbon chain saturated hydrocarbon
$R_2$ equals methyl
$R_3$ equals methyl
$R_4$ equals hydroxyethyl
$X^-$ equals bromide The catalyst is prepared in a 30% isopropyl alcohol solution.

Also, in the following example the vinyl thermoplastic resin is processed by a calender mill, and the full processing time includes a so-called "pick-up" time or first stage which is measured from the beginning of processing when the powder is first fed to the mill to the completion of such feeding when all the powder is fully rolling on the mill. The full processing time also includes a second stage, or true milling time, which is measured from the end of the pickup time to the cutting of the processed material from the rolls of the mill.

The tempertaure mentioned in the examples is either the true temperature of the milled thermoplastic material during the processing or the temperature of the surface of a mill roll. There should be a definite temperature difference between the two rolls as well as a difference in roll surface speed to produce the necessary shear in the material. In the following examples, that temperature difference is between 15° and 20° F., and the shear ratio is 1:1.1 corresponding to ratio of the roll revolutions 40:44. In other processing methods such as injection and transfer molding, the desired temperature differences will occur as between the molds and the materials.

Example 1

The vinyl material with 2% stabilizer is milled on a calender mill (36 inch rolls, 55 lb. load, roll temperature 275–290° F.). No modifier resin was used. Pick up time was 9 minutes, milling time was 4½ minutes, and total processing time was 13½ minutes. Because of the compatibility of the stabilizer, the product is transparent. No other additives such as colorants were used.

Example 2

All conditions were the same as in Example 1, but the vinyl material milled on the calender was a blend including a low molecular weight vinyl copolymer and a higher molecular weight vinyl material, such as the vinyl chloride-vinyl acetate copolymer specified as Opalon RT–501 in the Data Sheet entitled "Opalon RT–501," available on the filing date, used as a flow adjuster. Opalon RT–501 has the following composition and physical characteristics:

| | |
|---|---|
| Polyvinyl chloride _____percent__ | 91–93 |
| Specific gravity _____ | 1.375–1.382 |
| Specific viscosity _____ | 0.21–0.23 |
| Dry bulk density _____gm./cc__ | 0.50–0.60 |

Pick up time was 10 minutes, milling time 5½ minutes, total processing time 15½ minutes. The product was not transparent but only translucent, and the heat and time necessary to fuse the major part of the vinyl, the lower molecular weight material, was not sufficient for total fusing of the higher molecular weight vinyl. If higher processing temperatures and longer processing times are employed, the incompatibility between the two vinyls still exists because the high flow or reduced viscosity of the lower molecular weight material at the higher temperature reduces the shear to the point where it is insufficient for total fluxing of the higher molecular weight vinyl.

Example 3

The same two vinyl resins of Example 2 were used, but with the addition of the fluxing or modifying ester resin of the invention introduced in separate portions to the vinyl in a dry blend before calender milling, as follows: to 100 weight parts of vinyl resin and 2 weight parts of barium-cadmium stabilizer were added 3.8 weight parts of ester resin (2 to 50 parts can be used), 1.8 weight parts of epoxy resin (1 to 30 weight parts can be used), and 1.6 weight parts of catalyst (0.1 to 10 weight parts can be used) as a fully dried 100% concentrate. Pick up time was 7 minutes, milling time was 3 minutes, total processing time 10 minutes. Lubrication was higher, but the sheet product was uniform and stuck sufficiently to the mill rolls. Transparency was excellent, excepting that uneven distribution of the fluxing agents tended to cause some streaky haze in the product. Impact strength increases with increasing percentage addition of fluxing agents, but after reaching an optimum the impact strength decreases with higher fluxing ingredient content, and the product becomes brittle, the molded pieces show decreased internal stress and provided the benefits mentioned at the end of this description.

Example 4

Forty-five weight parts of ester resin and twenty weight parts epoxy resin are fluxed together with eleven weight parts of catalyst in 15 to 20 minutes and at temperatures between 120° C. and 140° C. The molten material was then cooled and became brittle. It was then pulverized by a hammermill type grinder, to powder form, of which less than 5% was retained on a 325 mesh sieve. Sufficient of this powdery modifier was added to the vinyl type resin to comprise 6% (2 to 50% can be added) of the total weight of the blend. The pick up time was from 4½ to 6 minutes, and the milling time was 2 to 2½ minutes, so that total processing time despite high lubricity was lowered to 6½ minutes compared to the 15½ minutes of Example 2. The molded product was water-clear and without streaky haze, and possessed very low internal stresses.

*Example 5*

In a laboratory kettle equipped with heating and cooling jacket and fitted with a reflux condenser which can be turned to stripping condenser add 240 ml. methyethylketone, 150 ml. ethyl acetate and 220 ml. toluene. Add to this solvent mixture while stirring 140 g. ester resin prepared as described above, 47 g. epoxy resin (Genepoxy 525), and 35 g. catalyst (lauryl-ethoxydimethylammonium bromide) as fully dried 100% concentrate (originally prepared as 30% solution in isopropanol), heat the solution to reflux point and reflux while stirring. Occasionally after the first hour take a small sample, evaporate solvent in a small vacuum oven and test melting point and acid number. As soon as the acid number drops to 60, turn condenser over, apply vacuum and strip solvent completely. Pour resin out of kettle while hot and repell the remainder of the solvents in an oven (preferably vacuum). Cool and pulversize the product and to one-hundred parts of vinyl resin add 2 parts of barium-cadmium stabilizer and 6 parts of above derived modifying material in powder form. The product gave practically the same results as the material produced in Example 4 from the same raw materials but without the solvent preparation process.

The composition used in Example 4 may be used in other vinyl type resins such as styrenes in amounts up to 50% of the total weight. As a result it speeds up production, lowers processing temperatures, and provides the advantages mentioned below. It is compatible with many of the vinyl linkage containing plastics, overbridges in compatibility many otherwise non-compatable additives, and causes reduction in interior stresses of the product.

Among the unexpected and unique advantages flowing from the use of the compounds of this invention are the following:

The modified vinyl compound prepared as described above in the specification and examples is thermoplastic and remains thermoplastic even after repeated heating at elevated temperatures used for the compounding and reaction of the modifying material or for the processing or reprocessing of the vinyl material incorporating the modifying material. There is no observed thermosetting even where the vinyl material degrades and decomposes.

In summary, the modifier compounds of this invention act as fluxing agents promoting full compatibility, lower melting or pour points result, and lower processing temperatures and shorter processing times result in less heat decomposition and degradation. Also, these compounds act as interceptors of heat decomposition products such as short chain alkyl groups, organic and inorganic non-ionized and ionized products, they provide high transparency, stop discoloration, inhibit further degradation, and nullify the catalytic action of the head decomposition compounds that end to further decomposition. The new modifiers give controlled lubricity, depending on processing temperatures and which gives perfect mold release. Such controlled lubricity facilitates controlled product surface activity and produces an invisible but effective surface activity for the life of the product. Also, this surface actively promotes repelling of dust and lint and produces a unique neutrinization effect.

Moldability of thermoplastic resins is also improved by the use of the modifier, and as a result of the higher impact strength and especially surface hardness the molded product has less wear, can withstand abrasion and has a high surface gloss. Also, the product is less breakable. Fillout of the mold or die is better and shrinkage of the material in a cold die is better controlled and even.

By producing better thermoplastic moldability, more even flow and perfect mold release, the modifier lowers in the processed thermoplastic material. Polaroscopic examinations show the thermoplast to have more even flow, much less internal stress generated because of internal lubricity, and the trend toward warping of the molded product is less. Such decreased internal stress is associated with any type of forming and processing, such as injection, compression and transfer molding, extrusion and vacuum forming. Finally, the heat plasticizing process for these forming methods, including fusion, and plasticizing of the thermoplast either in pellet, granule, powder, sheet and larger or smaller pre-forms is faster, more even, and free from distortion and decomposition.

I claim:
1. The process for forming a thermoplastic modifier composition usable in treating vinyl thermoplastic resin subject to processing, for improving physical properties thereof, that includes reacting a polyester material containing free carboxyl groups with a non-plasticizing complex epoxide containing active oxirane rings, in the presence of a catalyst of the class consisting of quaternary alkyl and aryl amines of the structural formula:

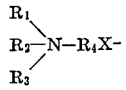

where $R_2$, $R_3$ and $R_4$ are alkyl groups, $R_1$ is selected from the class consisting of aryl groups and alkyl groups of a carbon chain length of 8–22, and $X^-$ is an anion that does not form an insoluble product with the action group, thereby to form the thermoplastic modifier, said polyester material being of the class consisting of natural rosins and the reaction product obtained by esterifying polyhydric alcohol and organic acid containing two carboxyl groups and having a chain length of 1 to 12 carbon atoms, said polyhydric alcohol being of the class consisting of alkyl and aryl alcohols containing two hydroxyl groups.

2. The process of claim 1 in which said complex epoxide is of the class consisting of epichlorohydrin diphenol condensate and epoxies condensed from organic dioxides.

3. The process of claim 1 in which 30 to 60 weight parts of polyester material, 10 to 40 weight parts of said epoxide, and 10 to 50 weight parts of said catalyst are fluxed together at temperatures below 155° C. and for a time interval between 15 and 20 minutes.

4. The process of claim 1 in which said polyester type material, epoxide and catalyst are dissolved in an inert solvent solution wherein the reaction is carried out with solution agitation, and including the step of distilling the solvent solution to produce the modifier composition.

5. The product obtained by the process of claim 1.

6. The process for modifying a vinyl thermoplastic resin subject to processing, that includes reducing the modifier composition of claim 3 to dry powdery form, and mechanically blending sufficient of the modifier composition in the thermoplastic resin that the modifier composition comprises between 2 and 50 percent by weight of the blended product.

7. The process for modifying a vinyl thermoplastic resin subject to processing for improving the physical properties thereof which comprises the steps of reacting
(I) from about 30 to 60 parts by weight of a polyester material of acid number of about 30–60 containing free carboxyl groups and selected from the class consisting of natural rosins and the reaction product obtained by esterifying polyhydric alcohol and an organic acid containing two carboxyl groups and having a chain length of 1 to 12 carbon atoms, said polyhydric alcohol being selected from the class consisting of alkyl and aryl alcohols containing two hydroxyl groups, with (II) from about 10 to about 40 parts by weight of a non-plasticizing complex epoxide containing active oxirane rings and selected from the class consisting of epichlorohydrin diphenol condensate and epoxies condensed from organic dioxides, (III) in the presence of from about 10 to about 50 parts by weight of a catalyst selected from the class consisting of quaternary alkyl and aryl amines of the structural formula:

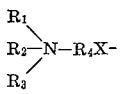

where $R_2$, $R_3$ and $R_4$ are alkyl groups, $R_1$ is selected from the class consisting of aryl groups and alkyl groups of a carbon chain length of 8–22, and $X^-$ is an anion that does not form an insoluble product with the action group, thereby to form the thermoplastic modifier composition, and adding from about 2 to about 50 percent by weight of said modifier composition to a vinyl thermoplastic resin to form a thermoplastic admixture, and mechanically working said admixture.

8. The process of claim 7 in which said organic acid is selected from the class of acids consisting of fumaric, maleic, abietic, itaconic, azelaic, phthalic,, isophthalic adipic and citric.

9. The process of claim 7 in which said polyhydric alcohol is selected from the class consisting of glycol, phenol, pentaerythritol, glycerol and sorbitol.

10. The product obtained by the process of claim 7.

References Cited by the Examiner

UNITED STATES PATENTS

| | | | |
|---|---|---|---|
| 2,674,648 | 4/1954 | Nicodemus | 260—835 |
| 2,691,007 | 10/1954 | Cass | 260—837 |
| 2,859,199 | 11/1958 | Parker | 260—835 |
| 2,970,983 | 2/1961 | Newey | 260—47 |
| 3,027,337 | 3/1962 | Tritsch | 260—836 |

FOREIGN PATENTS

| | | |
|---|---|---|
| 819,194 | 9/1959 | Great Britain. |

LEON J. BERCOVITZ, *Primary Examiner.*

C. W. IVY, *Assistant Examiner.*